United States Patent
Soccard

(10) Patent No.: US 7,896,994 B2
(45) Date of Patent: Mar. 1, 2011

(54) ULTRASONIC ASSEMBLY METHOD

(75) Inventor: Eric Soccard, Blain (FR)

(73) Assignee: European Aeronautic Defence and Space Company-EADS France, Paris (FR)

(*) Notice: Subject to any disclaimer, the term of this patent is extended or adjusted under 35 U.S.C. 154(b) by 234 days.

(21) Appl. No.: 11/994,588

(22) PCT Filed: Jul. 3, 2006

(86) PCT No.: PCT/EP2006/063806

§ 371 (c)(1),
(2), (4) Date: Jan. 3, 2008

(87) PCT Pub. No.: WO2007/003626

PCT Pub. Date: Jan. 11, 2007

(65) Prior Publication Data

US 2008/0210360 A1     Sep. 4, 2008

(30) Foreign Application Priority Data

Jul. 4, 2005   (FR) ................................. 05 52028

(51) Int. Cl.
*B32B 37/00* (2006.01)
(52) U.S. Cl. ............... 156/64; 156/73.1; 156/244.11; 428/98
(58) Field of Classification Search ............ 156/64, 156/73.1, 242, 244.11, 580.1, 580.2; 428/98
See application file for complete search history.

(56) References Cited

U.S. PATENT DOCUMENTS

| | | | |
|---|---|---|---|
| 5,593,620 A * | 1/1997 | Galas | 264/1.1 |
| 5,930,041 A | 7/1999 | Thielman | |
| 6,511,563 B2 * | 1/2003 | Roylance et al. | 156/73.1 |
| 2005/0028492 A1 | 2/2005 | Nagashima et al. | |

FOREIGN PATENT DOCUMENTS

| | | |
|---|---|---|
| DE | 42 17 727 A1 | 12/1993 |
| DE | 92 19 123 U1 | 5/1998 |
| EP | 0 261 850 A2 | 3/1988 |
| EP | 0 967 021 A2 | 12/1999 |
| FR | 2 584 336 A1 | 1/1987 |
| GB | 1047295 | 11/1966 |
| JP | 53-45380 | 4/1978 |
| WO | WO 2004/091841 A1 | 10/2004 |

* cited by examiner

*Primary Examiner*—James Sells
(74) *Attorney, Agent, or Firm*—Oblon, Spivak, McClelland, Maier & Neustadt, L.L.P.

(57) ABSTRACT

A method for assembling at least two rigid thermoplastic material based parts. The two parts are superposed to have at least one interface zone, wherein at least one of the two parts includes one or plural energy directors, protruding, situated in the interface zone. At least one excited ultrasonic source is brought into contact with one of the two parts, the ultrasonic source applying a compression effort to the two parts in a region of the interface zone located opposite the ultrasonic source. The ultrasonic source is continuously displaced at the interface zone to form a continuous welded joint by fusion of the thermoplastic material in the region positioned opposite the ultrasonic source. Such a method may find particular application for assembly of stratified parts.

20 Claims, 3 Drawing Sheets

ULTRASONIC ASSEMBLY METHOD

TECHNICAL FIELD

This invention relates to an ultrasonic assembly method of at least two thermoplastic resin based rigid parts. Such parts may be especially used in the aeronautical industry, for fuselage panels or a floor to be rigidified by one or several profiled sections fitted as frames or flush fitted. Other types of parts may of course be envisaged.

These parts are generally stratified and reinforced by fibres, for example carbon, the content of which is generally at least 5% in volume. They are generally formed by pre-impregnated superimposed layers and laid by orientating the reinforcing fibres differently according to the layers.

STATE OF THE PRIOR ART

Currently, there are several methods for assembling such thermoplastic resin based rigid parts. The two parts overlap at the assembly and the overlap zone forms what is called a welded joint.

Currently the assembly is made statically or virtually statically.

The static assembly methods correspond to the welding in a heated frame or in an autoclave or by thermal conduction of a filler material or by a heating electrical resistor. Static welding permits continuous and uniform joints of good quality to be obtained but leads to high costs and is not compatible with automation as the parts to be assembled are of large dimensions.

The patent application EP 0 261 850 describes an ultrasonic assembly method for large parts made of loaded thermoplastic resin. The parts are superposed and define an interface zone. Ultrasounds are applied by a tool called a sonotrode of which an active base comes into contact with one of the parts at the interface zone. When the tool is excited, heating occurs and there is fusion between the two parts in a region of the interface zone opposite the tool. The method described in this patent application thus proposes to create, sequentially, joined points next to one another and these joined points form a welded joint. Additional thermoplastic resin is inserted between the two parts to be assembled. The welded joint obtained is not truly uniform as it is formed by a series of joined points; it contains discontinuities. Such a welded joint is not satisfactory due to its lack of homogeneity and risks causing mechanical problems.

To improve the mechanical resistance of the assembly, a metallic framework may also be fitted at the interface between the two parts. However in this case, the welded joint is electrically conductive due to the presence of the metallic framework. It may even be damaged if it is hit by lightning.

In all cases, the welded joint obtained is not entirely satisfactory.

The sonotrode is interchangeable, a sonotrode is used with a large active base for the assembly of flat parts and smaller for the assembly of curved parts. The larger the base, the more ultrasonic energy needs to be provided to obtain the joint and the higher the cost of the joined point. Overall this method is costly in terms of cycle and energy.

The only known assembly methods capable of making continuous and uniform joints of good quality between two rigid thermoplastic parts are assembly by induction and assembly by laser.

In an assembly by induction, a metallic framework is placed at the interface between the two parts. It heats up under the effect of a magnetic field and transmits its heat to the two parts to be assembled which causes them to fuse together. This method is made complex by the fact that the carbon loading the thermoplastic material is made electrically conductive. The same disadvantages as with ultrasonic welding with a metallic framework appear.

The assembly by laser may only be used if one of the parts to be assembled is transparent to the laser radiation. By passing through the transparent material, the radiation from the laser causes heating and fusion of the materials at the interface between the two parts. In the near infra red range, most thermoplastic materials are transparent in so much as they are not loaded or practically not loaded in carbon. If the load in carbon exceeds approximately 5% in volume, they become absorbent and this method may not be used.

DESCRIPTION OF THE INVENTION

This invention has as its objective to propose an assembly method for at least two thermoplastic resin based rigid parts that does not have the limitations and difficulties mentioned above.

One objective in particular is to propose an assembly method providing the most uniform and continuous welded joint possible.

One objective of the invention is to propose an assembly method with reduced costs that may be easily automated.

Another objective is to propose an assembly method that may be used easily with any size parts.

Another objective is to propose an assembly method that may be used with parts of any geometrical form, whether they are flat or curved or even have several curves.

Another objective of the invention is to propose an assembly method that provides a welded joint with a satisfactory mechanical resistance without the need for a metallic reinforcement so as to avoid any problems of electromagnetic incompatibility and damage caused by lightning.

To achieve these objectives the invention relates more precisely to a method for assembling at least two rigid thermoplastic material based parts that comprises the steps consisting of:

superposing the two parts so that they have at least one interface zone, wherein at least one of the two parts has one or several energy directors, protruding, situated in the interface zone, exciting at least one ultrasonic source brought into contact with one of the two parts, wherein this ultrasonic source applies a compression effort to the two parts in a region of the interface zone located opposite the ultrasonic source, displacing the ultrasonic source continuously at the interface zone so as to form a continuous welded joint by fusion of the thermoplastic material in the region positioned opposite the ultrasonic source.

It is advantageous to improve the quality of the joint to maintain a pressure on the two parts in the interface zone in front and/or behind the region positioned opposite the ultrasonic source. The notions of in front or behind are in relation to the direction of displacement of the ultrasonic source.

It is possible that the pressure between the two parts in front and/or behind the region positioned opposite the ultrasonic source is adjustable.

The ultrasonic source supplies the parts with energy when it is excited, this energy may be regulated according to a parameter chosen from the speed of displacement of the ultrasonic source, its amplitude of vibration when it is excited or the compression effort that it applies to the two parts, in order to ensure optimal fusion.

The regulation is advantageously of the PID type.

The displacement may be made in one, two or three dimensions, which permits the easy assembly of parts with extremely diverse and complex forms.

The ultrasonic source features a sonotrode with a base that comes into contact with the part, wherein this base preferably has at least one curved edge to limit friction and to avoid damaging the part it is in contact with.

The curved edge is preferably situated on the front side of the sonotrode in the direction of the displacement.

The energy directors may be ribs or pins.

To improve the fusion, it is preferable for the energy directors to be carried by the part in contact with the ultrasonic source.

To improve the quality of the joint, it is preferable for the ribs to be directed in the direction of the displacement.

The thermoplastic material is semi-crystalline or amorphous.

When several ultrasonic sources are used, it is preferable for them to have the same synchronous displacement so as to reduce the assembly time.

This invention also relates to an assembly obtained by the method of the invention.

In this assembly, the part which carries the energy directors has been made by forming, stamping or extrusion to obtain the energy directors.

In this assembly at least one of the parts is preferably stratified.

One of the parts may be loaded with reinforcing fibres.

One of the parts may be a profiled section or a panel.

This invention also relates to an assembly device for at least two rigid thermoplastic material based parts. It features at least one ultrasonic welding set including an ultrasonic source to be brought into contact with one of the parts in an interface zone defined by the superposition of the two parts, and equipped with pressure means so as to apply a compression effort to the two parts, means for displacing the ultrasonic welding set so that the ultrasonic source follows a continuous path on the surface of the part, wherein this path has a trajectory which corresponds to that of a welded joint obtained in the interface zone opposite the ultrasonic source.

The ultrasonic welding set may include pressing means for the two parts positioned downstream of the ultrasonic source.

The ultrasonic welding set may include stabilisation means for the two parts positioned upstream of the ultrasonic source.

The pressing means and the stabilisation means may include one or several pressing rollers.

It is possible to provide means for regulating a pressure applied by the pressing means and/or the stabilisation means onto the two parts.

The ultrasonic source supplies energy to the two parts, the ultrasonic welding set may include means for regulating the energy according to a parameter chosen from the speed of displacement of the ultrasonic welding set, the amplitude of vibration of the ultrasonic source when it is excited or the compression effort that it applies to the two parts.

The regulation is advantageously of the PID type.

It is preferable for the displacement means to be common to several ultrasonic welding sets.

The displacement means may authorise a displacement in one, two or three dimensions.

The ultrasonic source features a sonotrode with a base to be brought into contact with the part, wherein this base preferably has at least one curved edge.

The curved edge may preferably be situated on the front side of the sonotrode in the direction of the displacement.

BRIEF DESCRIPTION OF THE DRAWINGS

This invention will be more clearly understood upon reading the description of examples of embodiments provided solely by way of example and in no way restrictively, in reference to the appended drawings, in which.

Identical, similar or equivalent parts of the different figures described below have the same numerical references so as to facilitate the passage from one figure to another.

The different parts shown in the figures are not necessarily of the same uniform scale, in order to make the figures easier to read.

DETAILED DESCRIPTION OF SPECIFIC EMBODIMENTS

Figure 1A:
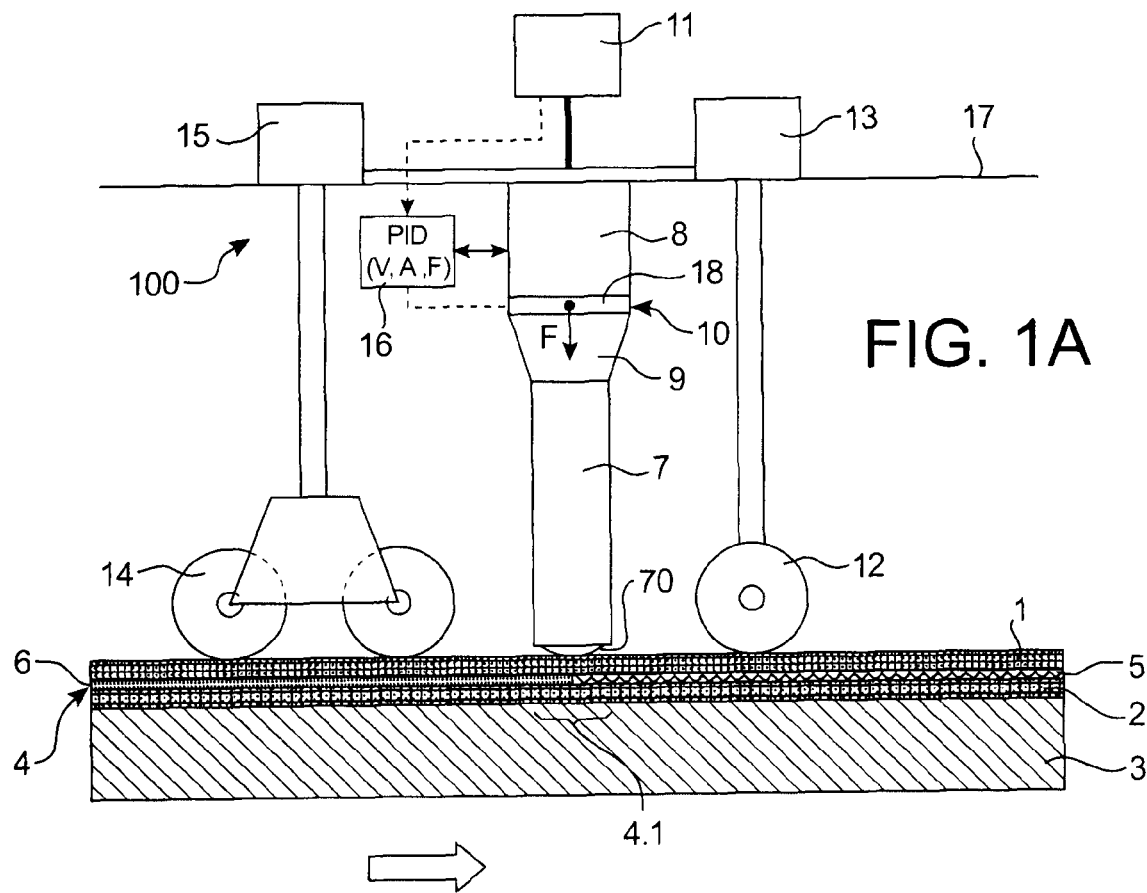
FIGS. 1A, 1B, 1C show an assembly device for at least two rigid flat parts according to the invention and the two parts before assembly and after assembly.
Figure 1B:
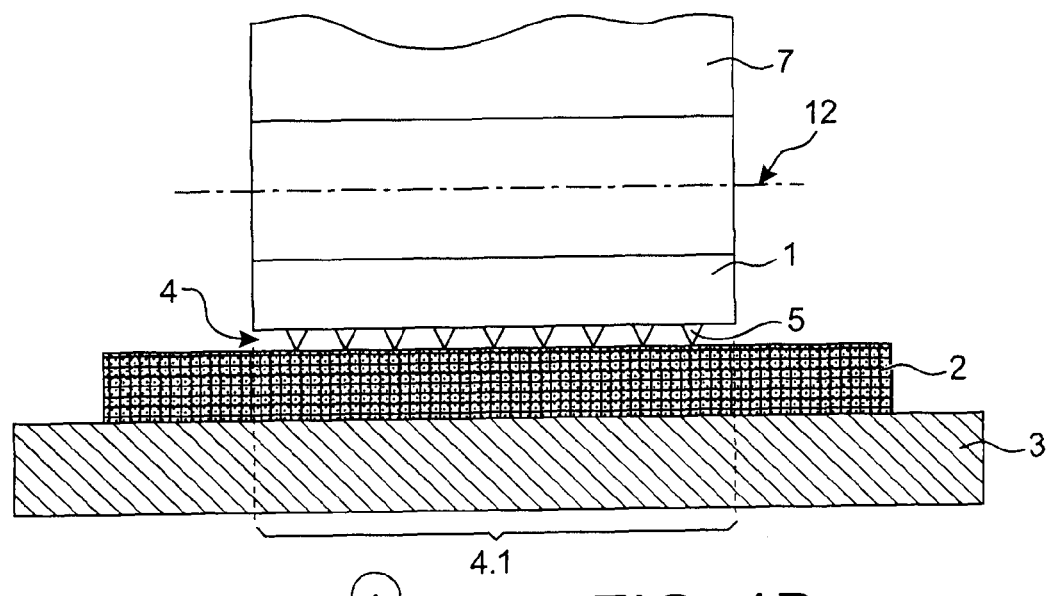
Figure 1C:
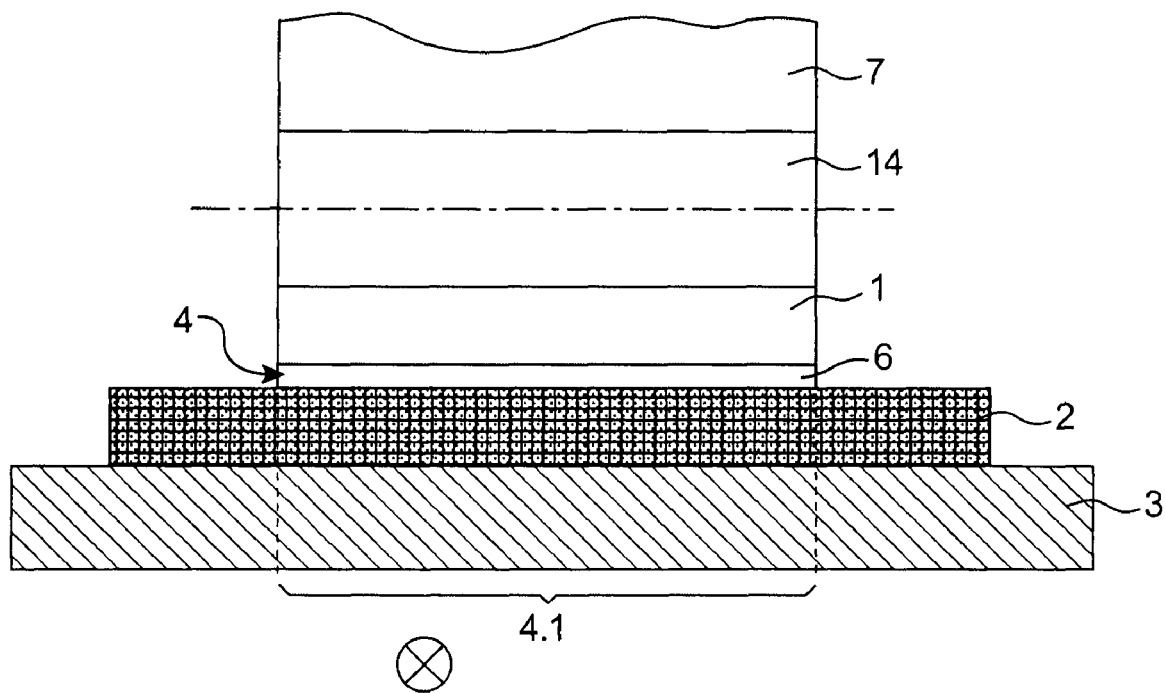

An example of an assembly method for at least two rigid thermoplastic material parts according to the invention in reference to FIGS. 1A, 1B, 1C, which respectively show an installation for the implementation of the method of the invention and the two parts before and after assembly will now be described.

It is supposed that in the example described, one of the parts is a profiled section 1 and the other a panel 2. Other types of parts may of course be envisaged. The panel 2 is shown as being flat but it could be curved as in FIG. 2A especially if it is an aircraft fuselage panel. The profiled section 1 may in this case match the curve of the panel.

These parts 1, 2 are rigid, they are made from a thermoplastic material and are preferably stratified. To reinforce their rigidity, they may be reinforced with fibres. The reinforcing fibres may be carbon, glass or boron for example. Such parts are commonly called composite structures. It is supposed that the base used in FIG. 1 schematises the fibres.

The thermoplastic material is preferably amorphous or semi-crystalline. For the thermoplastic material, it is possible to use for example resins of the types: PEI (polyetherimide), PEEK (polyethether-cetone), PPS (polyphenylene sulphate), PEKK (polyetherketoneketone).

The assembly method applies both to parts 1, 2 highly loaded in reinforcing fibres (for example above 30% in volume) and to parts with low loads (for example less than 5% in volume) or even not loaded at all. The assembly will be made by ultrasounds using at least one ultrasonic welding set 10 comprising a sonotrode 7 mechanically coupled to a converter generator 8 by means of an amplifier 9 (known as a booster). The converter generator 8 supplies, from electrical energy, mechanical vibrations to the sonotrode 7. The amplifier 9 amplifies the amplitude of the vibrations provided by the converter generator 8. The sonotrode 7 also amplifies the amplitude of the vibrations. The frequency of the vibrations may be between around 15 and 40 kHz and preferably have a value of around 20 kHz.

The two parts 1, 2 are superposed at least locally and an interface zone 4 is defined between them. One of the parts 2 rests on a filler pose tool 3 or anvil and the ultrasonic source 10 is brought into contact with the other part 1 to be assembled, by the sonotrode 7, at the interface zone 4. A compression effort F is applied to the two parts by the ultrasonic source in a region 4.1 of the interface zone 4 located opposite the ultrasonic source. This compression effort may be provided by pressure means 18, for example pneumatic, that are part of the ultrasonic source 10.

The ultrasonic source 10 is excited and moved continuously while remaining in contact with the other part 1 to be assembled at the interface zone 4 so as to follow a path that will create at the interface zone 4 a continuous and uniform welded joint 6 between the two parts 1, 2 to be assembled. The displacement of the sonotrode 7 may be rectilinear or curvilinear to the surface of the stack. This surface may be flat or curved and it corresponds to the surface of the part in contact with the sonotrode. In all cases, this displacement is continuous. This displacement may be made in a plane or in space, which is to say in one, two or three dimensions. A displacement in a single dimension provides a rectilinear joint 6. A displacement in two dimensions may allow a frame to be assembled onto a flat panel in a single pass of the ultrasonic source 10. A displacement in three dimensions may allow the assembly with a linear joint of two parts with two curved radii.

The means 11 of displacing the ultrasonic source 10 are shown diagrammatically by a motor. The ultrasonic source 10 may cooperate with a slide, a gantry or be carried by an arm that may be articulated, depending on the movement that it is to make. The slide permits a movement in one dimension, the gantry can authorise a movement in two dimensions and the articulated arm a movement in three dimensions. In FIG. 1A a slide or a gantry 17 are represented.

By intermolecular friction, the cyclic vibration energy of the sonotrode 7 is converted into thermal energy in the thermoplastic material in the region 4.1 of the interface zone 4 opposite the sonotrode 7. The sonotrode 7 has an active base 70 which comes into contact with the other part 1 to be assembled. This base 70 features two lateral edges, a front edge and a rear edge according to the displacement planned. The width of the base 70 in contact with the other part 1 corresponds substantially to that of the joint 6 that will be obtained. These dimensions are chosen according to the thermal energy to be provided to obtain the fusion of the thermoplastic material in the zone of the interface 4. Temperatures of around 400° C. are required to obtain the fusion of PEEK resins and around 300° C. to obtain the fusion of PPS resins.

It is preferable that the base 70 of the sonotrode 7 is not completely flat but that it is curved especially at its front side to limit the friction with the part 1 that it is contact with. This also avoids damaging the surface of the part 1 that it is in contact with during the displacement. This curve also provides an advantage in the case of a curved part. If the surfaces of the parts to be assembled are curved, it is preferable that the rear edge is also curved.

In this type of ultrasonic source 10, the sonotrode 7 is generally removable especially so that it may be adapted to the characteristics of the joint 6 to be made and those of the surfaces to be assembled. The same generally applies to the amplifier 9 so that the gain of the ultrasonic source 10 may be adapted.

In order to be sure that the two parts 1, 2 are solidly joined to one another, at least one of the parts 1, 2 features one or several energy directors 5 located in the interface zone 4. These energy directors 5 concentrate, channel the mechanical energy to the interface zone 4 and by melting contribute to the formation of the welded joint 6 of the desired section at the interface between the two parts 1, 2. In FIG. 1, the energy directors 5 are carried by the profiled section 1 but it may be envisaged that this may be the other part 2 which has the energy directors or even that they are on both parts 1, 2 as can be seen in FIG. 2. However, to improve the quality of the welded joint 6, it is preferable for the energy directors to be located on the part 1 that will come into contact with the ultrasonic source 10.

An energy director 5 may have the form of a rib or a pin protruding from the part 1 carrying it towards the other part 2 when the two parts are superposed. When an energy director is of the rib type, the latter generally follows the direction of the joint 6. The figures show both rib and pin energy directors. Preferably, several ribs or several pins will be positioned, spaced apart to suit the width of the joint 6 desired. As concerns the pins, they may be positioned in lines or in staggered rows or other.

The transversal section of the energy directors 5 may be substantially triangular, trapezoidal, rectangular, square, semi-circular or other. If this concerns pins, they may be parallelepipedal, semi-spherical, pyramidal or conical and possibly truncated.

These energy directors 5 may be made directly during the fabrication of the part that carries them by stamping, extrusion or continuous forming with a grooved tool if making ribs.

For example, to make a rectilinear joint with an approximate thickness of 0.05 millimeters in PEEK resin, it is possible to have rib type energy directors, orientated according to the main axis of the joint, spaced every 1.5 millimeters and of which the summit height is 0.3 millimeters. The space between them is measured from summit to summit. The straight section of the energy directors in this example is triangular.

It is preferable to have pressing means 12 positioned downstream of the ultrasonic source 10 and which press the two parts 1, 2 against one other. This pressure is applied downstream of the region 4.1 of the interface zone 4 located opposite the ultrasonic source 10. These pressing means 12 ensure the satisfactory location of the two parts 1, 2 before they are fused while they are still free. These pressing means 12 may be formed of one or several pressing rollers brought into contact with the two superposed parts 1, 2. Means of regulating the pressure 13 may be provided; for example they may be pneumatic means featuring a solenoid valve. Preferably a locating pressure less than or equal to that of the industrial compressed air pressure, around 6 bars, will be chosen.

It is advantageous to provide stabilisation means 14 positioned upstream of the ultrasonic source 10. They press the two parts 1, 2 that have just been assembled and hold them in position while the welded joint 6, that has just been created, is solidifying as it cools. This pressure is applied upstream of the region 4.1 of the interface zone 4 located opposite the ultrasonic source 10. These stabilising means 14 may be formed by one or several stabilising rollers. Means of regulating the pressure 15 applied to the rollers may be provided or regulation. This could be for example pneumatic means featuring a solenoid valve. Preferably a locating pressure less than or equal to that of the industrial compressed air pressure, around 6 bars, will be chosen.

To obtain a welded joint 6 of optimum quality, the aim is to provide in the interface zone 4 an instantaneous energy that is sufficient to ensure correct fusion of the thermoplastic material at the surface of the two parts and the thermoplastic material of the energy directors.

It is possible to provide means of regulating 16 the level of the energy provided by the ultrasonic source 10. These regulation means 16 may be of the standard PID type (abbreviation of proportional integral derivative). Such regulation means 16 are classic for the person skilled in the art. For the regulation parameter of the energy, it is possible to choose the amplitude A of the ultrasonic source 10, which is to say the amplitude at the converter, the speed of displacement V of the ultrasonic source 10 or the compression effort F applied by the ultrasonic source 10 to the parts 1, 2 to be assembled.

If the pressing means 12 and/or the stabilisation means 14 are fitted, they are attached to the ultrasonic source 10 and follow its displacement. They form, with the ultrasonic source 10, an ultrasonic welding set reference 100.

If regulation means 16 are fitted, they are also included in the ultrasonic welding set 100.

However, it is considered that the ultrasonic welding set 100 does not include the displacement means 11.

Figure 2A:
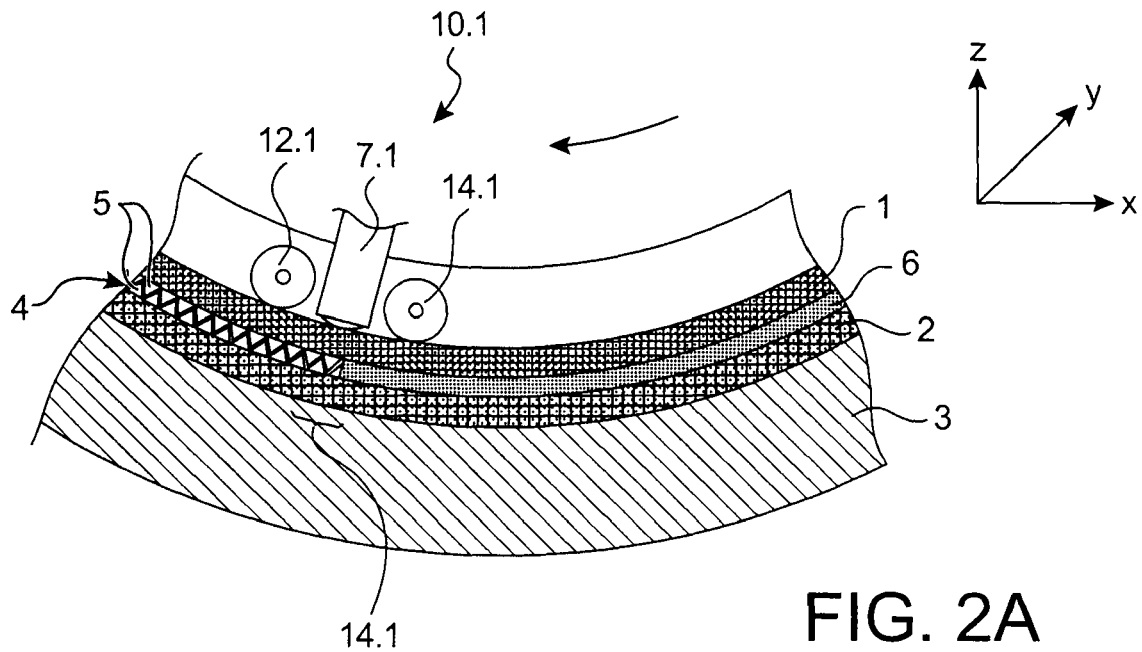
FIGS. 2A, 2B show diagrammatically in a longitudinal and transversal cross section an assembly device for at least two rigid curved parts according to the invention.
Figure 2B:
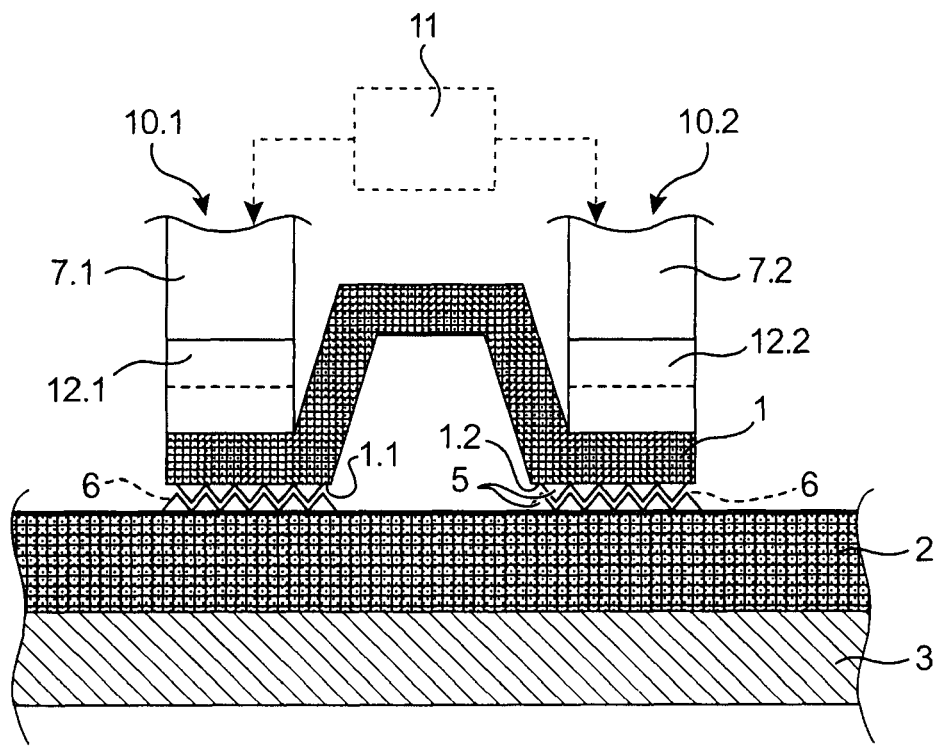

In FIGS. 2A, 2B an assembly operation is shown of at least two parts 1, 2 also using more than one ultrasonic source 10.1, 10.2. An x, y, z ortho-standardised reference is marked to make it clear that the ultrasonic source may be displaced in three dimensions.

One of the parts to be assembled is a profiled section 1 with a section substantially in the form of an omega. The other part 2 is a curved panel. The omega shaped profiled section 1 has at its base two distinct assembly surfaces 1.1, 1.2 to be fixed to the panel 2. Two welded joints 6 are to be made. With the method of the invention, these two joints 6 may be made simultaneously by using two welding sets similar to those previously described and used in parallel with a common displacement control. In FIG. 2, the ultrasonic welding sets are shown simply by their ultrasonic source 10.1, 10.2, by the pressing means 12.1, 12.2 and the stabilisation means 14.1, 14.2. The displacement means 11 are common to the two ultrasonic welding sets. The two ultrasonic sources 10.1, 10.2 thus have a same synchronous displacement.

In these FIGS. 2A, 2B, it is supposed that the directing elements 5 are located on both of the parts 1, 2 to be assembled.

Even though several embodiments of this invention have been described in detail, it may be understood that different changes and modifications may be made without this going beyond the scope of the invention.

The invention claimed is:

1. A method for assembling at least two rigid thermoplastic material based composite parts including pre-impregnated superimposed layers and laid with a double radius, the method comprising:
   superposing the two parts so that they include at least one interface zone, wherein at least one of the two parts includes one or plural energy directors, protruding, situated in the interface zone;
   exciting at least one ultrasonic source brought into contact with one of the two parts, wherein the ultrasonic source compresses the two parts in a region of the interface zone located opposite the ultrasonic source; and
   displacing the ultrasonic source continuously along a surface of the one of the two parts so as to form at the interface zone a continuous welded joint, along a path of displacement of the ultrasonic source, by fusion of the thermoplastic material in the region positioned opposite the ultrasonic source.

2. The assembly method according to claim 1, wherein the two parts are held under pressure in the interface zone in front and/or behind the region positioned opposite the ultrasonic source.

3. The assembly method according to claim 2, wherein the pressure between the two parts in front and/or behind the region positioned opposite the ultrasonic source is adjustable.

4. The assembly method according to claim 1, wherein the ultrasonic source supplies the parts with energy when the ultrasonic source is excited, and the energy is regulated according to a parameter chosen from among speed of displacement of the ultrasonic source, amplitude of vibration when the ultrasonic source is excited, and level of compression that the ultrasonic source applies to the two parts.

5. The assembly method according to claim 4, wherein the regulation is of PID type.

6. The assembly method according to claim 1, wherein the ultrasonic source includes a sonotrode with a base that comes into contact with the part, the base including at least one curved edge.

7. The assembly method according to claim 6, wherein the curved edge is located on a front side of the sonotrode in the direction of displacement.

8. The assembly method according to claim 1, wherein the energy directors are ribs or pins.

9. The assembly method according to claim 8, wherein the ribs are directed in the direction of the displacement.

10. The assembly method according to claim 1, wherein the energy directors are carried by the part in contact with the ultrasonic source.

11. The assembly method according to claim 1, wherein the thermoplastic material is amorphous or semi-crystalline.

12. The assembly method according to claim 1, wherein plural ultrasonic sources are used that have a same synchronous displacement.

13. The assembly of at least two parts obtained by the method according to claim 1, wherein the part that carries the energy directors is made by forming, stamping, or extrusion to obtain the energy directors.

14. The assembly of at least two parts obtained by the method according to claim 1, wherein at least one of the two parts is loaded with reinforcing fibers.

15. The assembly of at least two parts obtained by the method according to claim 1, wherein one of the parts is a profiled section.

16. The assembly of at least two parts obtained by the method according to claim 1, wherein one of the parts is a panel.

17. The assembly method according to claim 1, the method further comprising fusing a plurality of energy directors situated in the interface zone to form the continuous welded joint, wherein the fusing includes fusing an area between at least two of the energy directors.

18. The assembly method according to claim 1, further comprising locating the two parts prior to the fusion of the thermoplastic material in the region positioned opposite the ultrasonic source by pressing the two parts together in front of the region positioned opposite the ultrasonic source.

19. The assembly method according to claim 1, further comprising stabilizing the two parts after the fusion of the thermoplastic material in the region positioned opposite the ultrasonic source by pressing the two parts together behind the region positioned opposite the ultrasonic source.

20. The assembly method according to claim 1, wherein the displacement is rectilinear or curvilinear.

* * * * *